United States Patent
Meyers et al.

(10) Patent No.: US 10,851,571 B2
(45) Date of Patent: Dec. 1, 2020

(54) HINGE ASSEMBLY WITH ADJUSTABLE TORQUE

(71) Applicant: Dell Products L.P., Round Rock, TX (US)

(72) Inventors: David Michael Meyers, Round Rock, TX (US); Jason Scott Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/373,360

(22) Filed: Apr. 2, 2019

(65) Prior Publication Data

US 2020/0318407 A1 Oct. 8, 2020

(51) Int. Cl.
*E05D 11/08* (2006.01)
*G06F 1/16* (2006.01)

(52) U.S. Cl.
CPC .......... *E05D 11/087* (2013.01); *G06F 1/1681* (2013.01); *E05D 2011/088* (2013.01); *E05Y 2900/606* (2013.01); *G06F 1/1616* (2013.01)

(58) Field of Classification Search
CPC .. E05D 11/087; E05D 11/08; E05D 2011/088
See application file for complete search history.

(56) References Cited

U.S. PATENT DOCUMENTS

| | | | | |
|---|---|---|---|---|
| 7,673,844 B2* | 3/2010 | Zhang | ................... | F16M 11/10 16/337 |
| 9,823,638 B2* | 11/2017 | McBroom | ............. | G06F 1/1681 |
| 10,401,916 B1* | 9/2019 | Sanchez | ................ | G06F 1/1681 |
| 10,534,407 B2* | 1/2020 | Alva | ..................... | G06F 1/1681 |
| 2002/0112319 A1* | 8/2002 | Kida | ..................... | G06F 1/1681 16/342 |
| 2005/0046374 A1* | 3/2005 | Ogawa | .................. | G06F 1/1681 318/614 |
| 2011/0099759 A1* | 5/2011 | Chang | ................... | G06F 1/1681 16/331 |
| 2011/0252600 A1* | 10/2011 | Chang | ................... | G06F 1/1681 16/277 |
| 2011/0283480 A1* | 11/2011 | Chang | ................... | G06F 1/1681 16/333 |
| 2020/0004337 A1* | 1/2020 | Hendren | ............... | G06F 1/1616 |
| 2020/0142454 A1* | 5/2020 | Alva | ..................... | G06F 1/1681 |

* cited by examiner

*Primary Examiner* — Jeffrey O'Brien
(74) *Attorney, Agent, or Firm* — Baker Botts L.L.P.

(57) ABSTRACT

A hinge assembly for a computing system, including a first hinge bracket including a hinge shaft, the first hinge bracket coupled to a first body of the computing system; a second hinge bracket coupled to the hinge shaft, the second hinge bracket coupled to a second body of the computing system; friction disks positioned on the hinge shaft, the friction disks configured to exert a torque on the hinge shaft; an adjustment nut coupled to the hinge shaft, the adjustment nut configured to exert a force on the friction disks; a first spring clutch coupled to the adjustment nut, the first spring clutch configured to control a positioning of the adjustment nut relative to the friction disks; a first shape memory alloy (SMA) wire coupled to the spring clutch, wherein, upon energization, a length of the first SMA wire is adjusted to change the positioning of the adjustment nut.

18 Claims, 6 Drawing Sheets

HINGE ASSEMBLY WITH ADJUSTABLE TORQUE

BACKGROUND

Field of the Disclosure

The disclosure relates generally to a hinge assembly used in information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include dual-body (or two-body) computing devices that include hinges to allow rotation of the bodies with respect to each other. Hinge torque (of the hinge) can be susceptible to change over time due to wear of components of the computing device and loss of lubrication or change of lubrication viscosity. To help ensure that the hinge torque remains high enough over the life of the computing device, the hinge can include higher than required torque such that the torque is allowed to decrease gradually to the desired torque over the lifetime of the computing device. However, the excessively high original torque can require stronger mounting techniques.

SUMMARY

Innovative aspects of the subject matter described in this specification may be embodied in a hinge assembly for a dual-body computing system, the hinge assembly including a first hinge bracket including a hinge shaft, the first hinge bracket coupled to a first body of the dual-body computing system; a second hinge bracket coupled to the hinge shaft, the second hinge bracket coupled to a second body of the dual-body computing system; a plurality of friction disks positioned on the hinge shaft, the friction disks configured to exert a torque on the hinge shaft resulting from a clamping force along an axis of the hinge shaft; an adjustment nut coupled to the hinge shaft, the adjustment nut configured to exert a force on the friction disks to control the torque exerted by the friction disks on the hinge shaft; a first spring clutch coupled to the adjustment nut, the first spring clutch configured to control a positioning of the adjustment nut relative to the friction disks to control the force exerted by the adjustment nut on the friction disks; and a first shape memory alloy (SMA) wire coupled to the first spring clutch, wherein, upon energization, a length of the first SMA wire is adjusted to change the positioning of the adjustment nut from a first position state to a second position state.

These and other embodiments may each optionally include one or more of the following features. For instance, the first spring clutch is positioned between the adjustment nut and the friction disks. The hinge assembly further including a second spring clutch coupled to the adjustment nut; and a second SMA wire coupled to the second spring clutch, wherein, upon energization, a length of the second SMA wire is adjusted to change the positioning of the adjustment nut from the second position state to a third position state. Upon energization, the length of the first SMA wire is adjusted to rotate the adjustment nut in a counter-clockwise direction to change the positioning of the adjustment nut from the first position state to the second position state, and, wherein upon energization, the length of the second SMA wire is adjusted to rotate the adjustment nut in a clockwise direction to change the positioning of the adjustment nut from the second position state to the third position state. The first spring clutch and the second spring clutch are positioned on opposite ends of the adjustment nut. Prior to energization, the length of the first SMA wire is in a first state, and upon energization, the length of the first SMA wire is in a second state, the length of the first SMA wire returning to the first state after removal of the energization of the first SMA wire. Upon the length of the first SMA wire returning to the first state after energization of the first SMA wire, the adjustment nut stays in the second position state. The first SMA wire is electrically coupled to an electrical source to provide energization of the first SMA wire. The hinge assembly further including a sensor to determine the torque exerted on the hinge shaft.

Innovative aspects of the subject matter described in this specification may be embodied in an information handling system, including a dual-body computing system; a hinge assembly, including: a first hinge bracket including a hinge shaft, the first hinge bracket coupled to a first body of the dual-body computing system; a second hinge bracket coupled to the hinge shaft, the second hinge bracket coupled to a second body of the dual-body computing system; a plurality of friction disks positioned on the hinge shaft, the friction disks configured to exert a torque on the hinge shaft resulting from a clamping force along an axis of the hinge shaft; an adjustment nut coupled to the hinge shaft, the adjustment nut configured to exert a force on the friction disks to control the torque exerted by the friction disks on the hinge shaft; a first spring clutch coupled to the adjustment nut, the first spring clutch configured to control a positioning of the adjustment nut relative to the friction disks to control the force exerted by the adjustment nut on the friction disks; and a first shape memory alloy (SMA) wire coupled to the first spring clutch, wherein, upon energization, a length of the first SMA wire is adjusted to change the positioning of the adjustment nut from a first position state to a second position state.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR
EMBODIMENT(S)

This document describes a hinge assembly that utilizes shape memory allow (SMA) wires coupled to spring clutches to adjust a position of an adjustment nut which clamps hinge friction surfaces and springs together to generate hinge torque. One SMA wire at a time can be pulsed to gradually tighten or loosen the adjustment nut.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
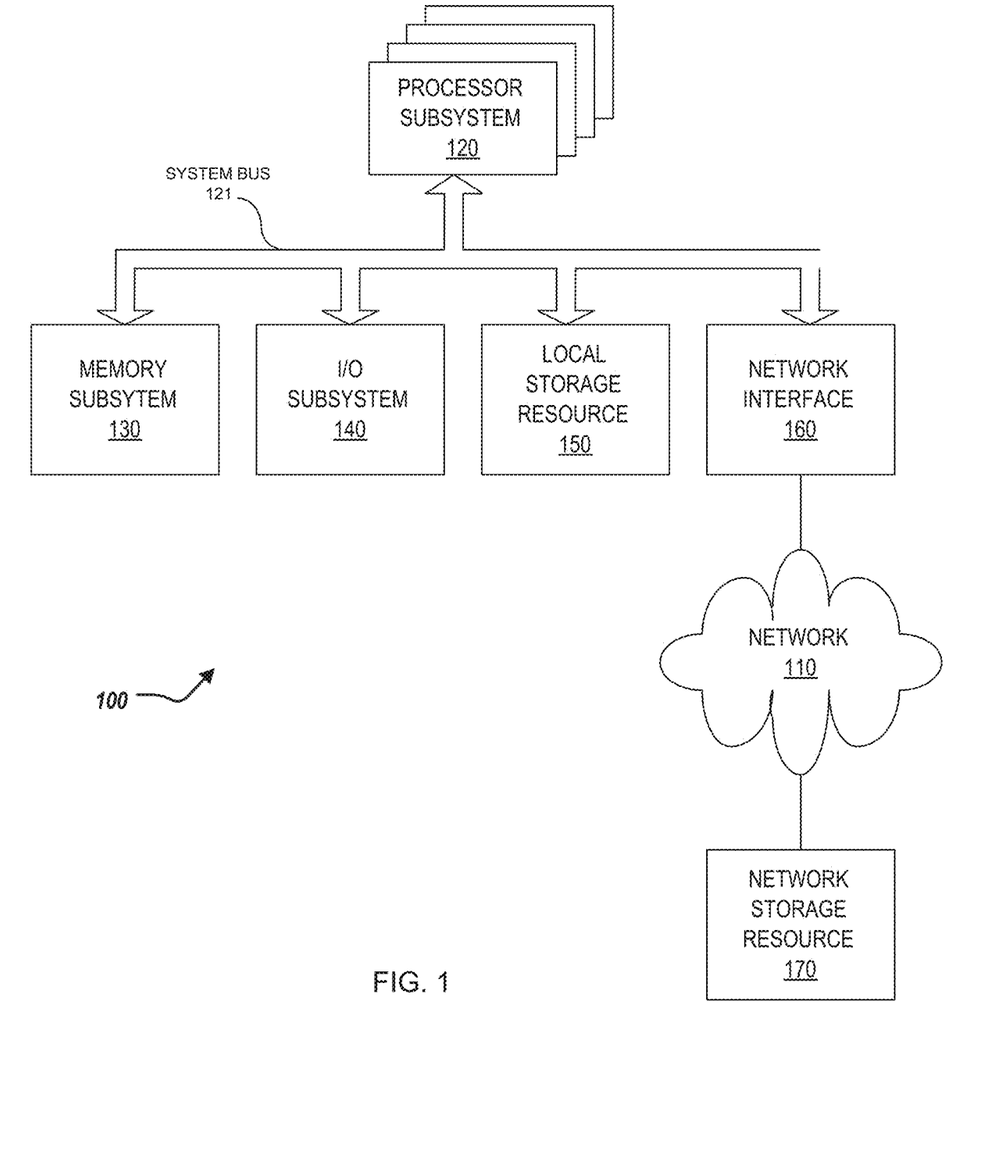
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
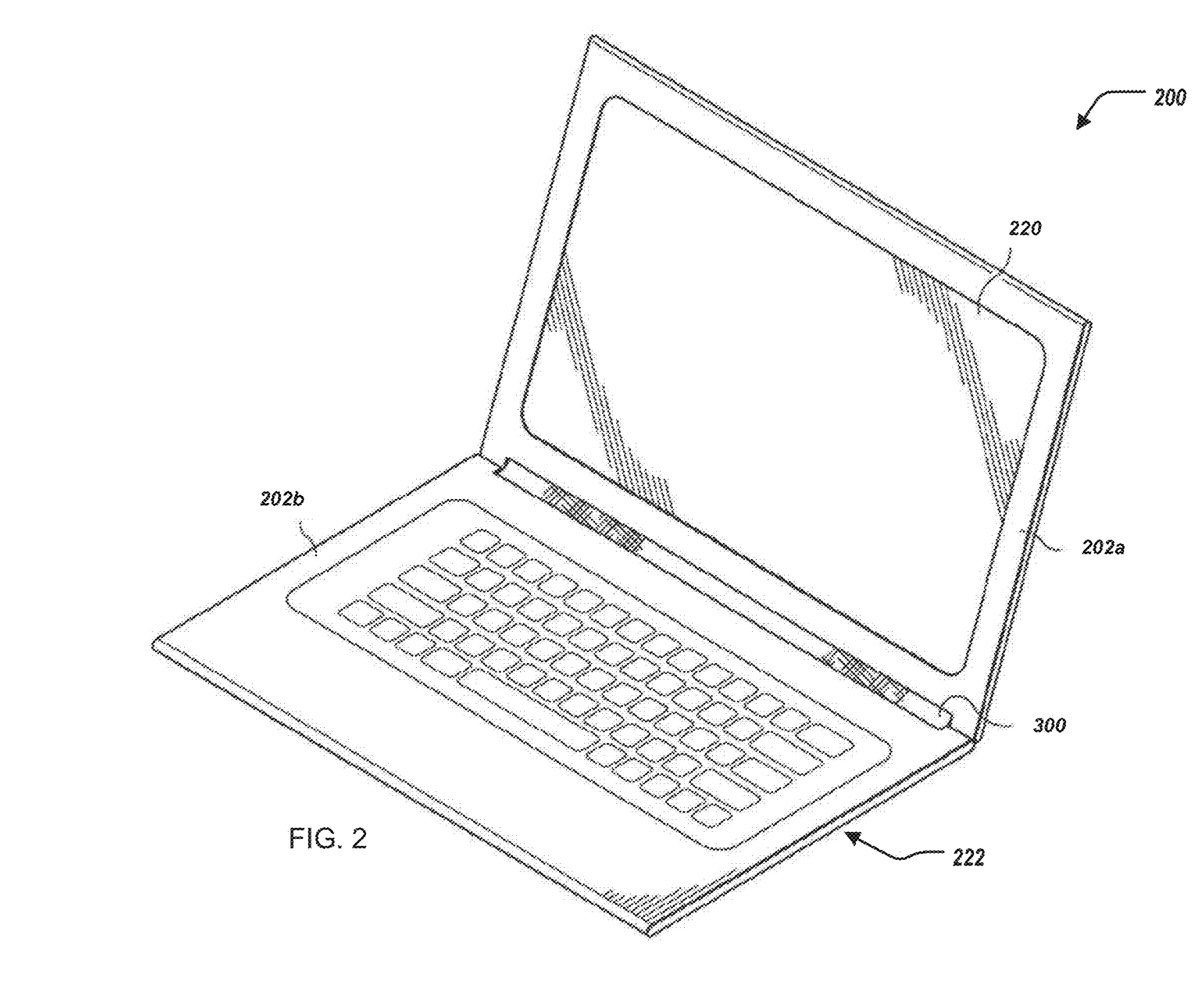
FIG. 2 illustrates a dual-body computing device.

Turning now to FIG. 2, FIG. 2 illustrates a dual-body (or two-body) computing system 200. The dual-body computing system 200 can include a first body 202a and a second body 202b (collectively referred to as bodies 202). The computing system 200 can be similar to the information handling system 100 of FIG. 1. In some examples, the first body 202a can include a display 220 and the second body 202b can include a keyboard 222 (and typically also include computing components).

The computing system 200 can pivot about an axis provided by a hinge 300 that connects the bodies, described further herein. That is, each body 202 can pivot about the axis of the hinge 300 with respect to the other body 202.

Figure 3A:
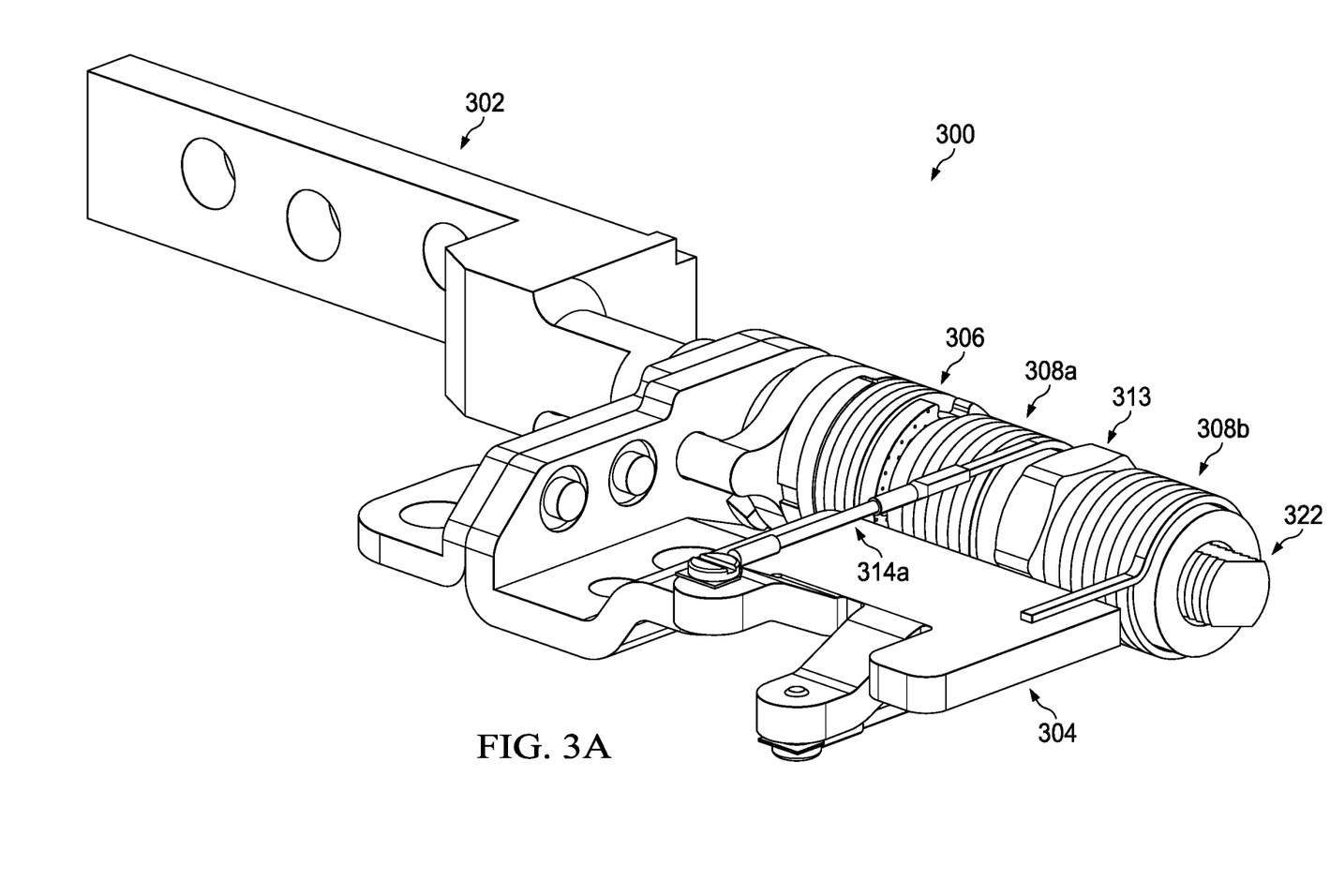
FIG. 3A illustrates a perspective view of a hinge assembly of the computing device.
Figure 3B:
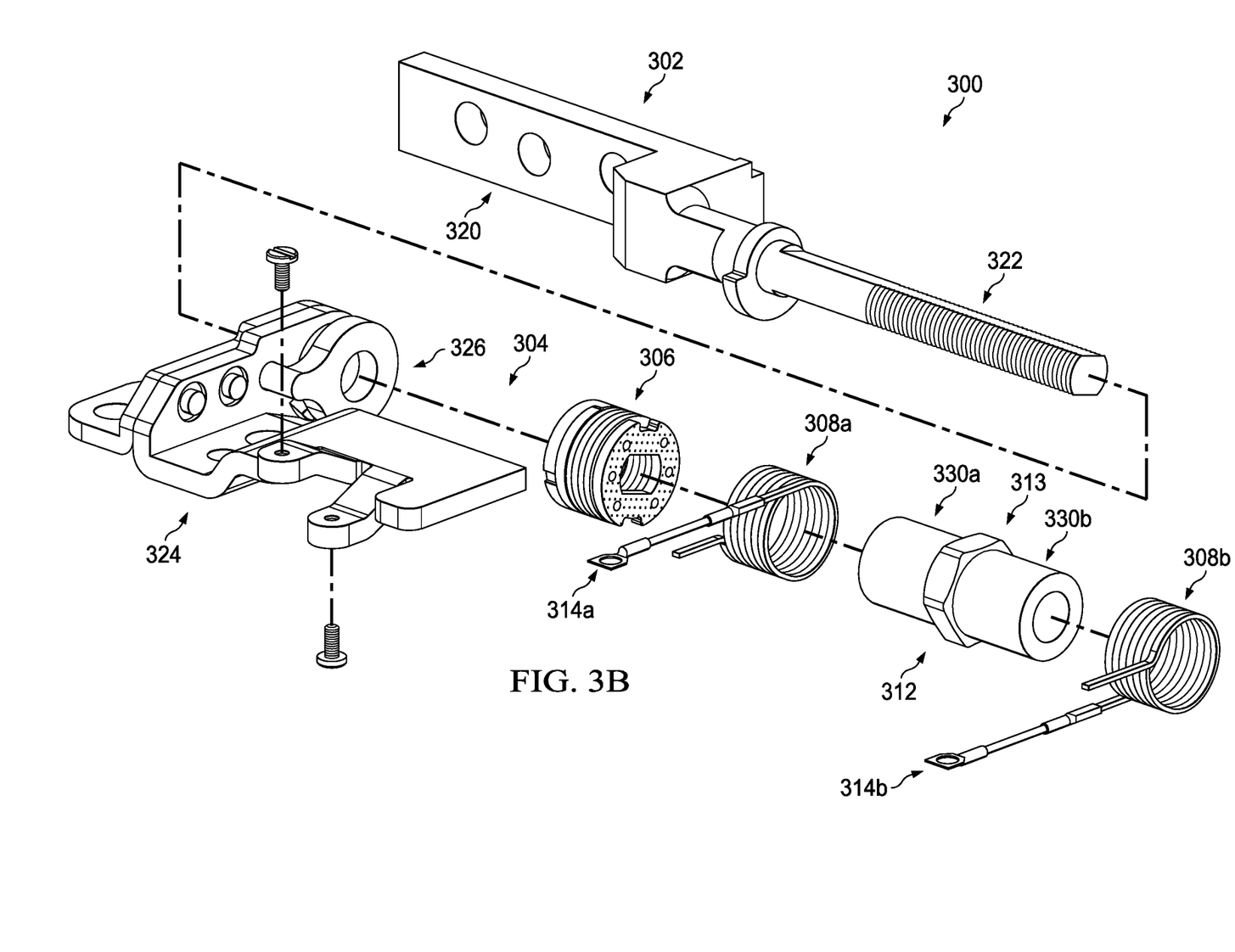
FIG. 3B illustrates an exploded view of the hinge assembly of the computing device.

FIGS. 3A, 3B illustrates a hinge assembly 300 for the computing system 200. FIG. 3A illustrates a perspective view of the hinge assembly 300, and FIG. 3B illustrates an exploded view of the hinge assembly 300. The hinge assembly 300 includes a first hinge bracket 302, a second hinge bracket 304, friction disks 306, a first spring clutch 308a and a second spring clutch 308b (collectively referred to as spring clutches 308), an adjustment nut 312, a first shape memory alloy wire 314a and a second shape memory wire 314b (collectively referred to as shape memory alloy (SMA) wires 314).

The first hinge bracket 302 can be coupled to the first body 202a. For example, the portion 320 of the first hinge bracket 302 can be coupled to the first body 202a. The first hinge bracket 302 can further include a hinge shaft 322. The second hinge bracket 304 can be coupled to the second body 202b. For example, the portion 324 of the second hinge bracket 304 can be coupled to the second body 202b. The second hinge bracket 304 can further be coupled to the hinge shaft 322. Specifically, the hinge shaft 322 can be positioned within an opening 326 of the second hinge bracket 304 to couple the second hinge bracket 304 to the first hinge bracket 302. In some examples, the hinge shaft 322 is rotatably coupled to the second hinge bracket 304 in that the first hinge bracket 302 is able to rotate about the second hinge bracket 304 thru the hinge shaft 322 and the opening 326.

The friction disks 306 are positioned on the hinge shaft 322. The friction disks 306 are configured to exert a torque on the hinge shaft 322 resulting from a clamping force along an axis of the hinge shaft 322. That is, the friction disks 306 control a movement of the hinge shaft 322, and specifically, the first hinge bracket 302, with respect to the second hinge bracket 304. To that end, the friction disks 306 are configured to exert the torque on the hinge shaft 322 resulting from a clamping force along the axis of the hinge shaft 322 to control the movement of the hinge shaft 322, and specifically, the first hinge bracket 302 with respect to the second hinge bracket 304.

The adjustment nut assembly 312 is further positioned on the hinge shaft 322 and abuts the friction disks 306. Specifically, the adjustment nut assembly 312 includes an adjustment nut 313 and flanges 330a and 330b (collectively referred to as flanges 330). The flange 330a abuts the friction disks 306. The adjustment nut assembly 312 can be coupled to the first spring clutch 308a and the second spring clutch 308b. Specifically, the first spring clutch 308a can be positioned around the flange 330a and the second spring clutch 308b can be positioned around the flange 330b. That is, an inner diameter (ID) of each of the spring clutches 308 is greater than an outer diameter (OD) of the flanges 330. As a result, in some examples, the adjustment nut assembly 312 is able to spin or translate freely or with very low drag with respect to the spring clutches 308.

To that end, the adjustment nut assembly 312 can apply pressure to the friction disks 306 to control the torque that is applied by the friction disks 306. Specifically, the adjustment nut assembly 312, based on a positioning of the adjustment nut 313 relative to the friction disks 306, controls the torque that is applied by the friction disks 306. That is, as the adjustment nut assembly 312 applies pressure to the friction disks 306—the flange 330a abuts the friction disks 306 to provide such pressure—the friction disks 306 adjust the amount of torque applied to the hinge shaft 322. Thus, to adjust the amount of torque applied by the hinge shaft 322, the positioning of the adjustment nut 312 relative to the friction disks 306 can be adjusted—e.g., the adjustment nut assembly 312 can be "tightened" or "loosened" relative to the friction disks 306.

The adjustment nut 312 exerts a force on the friction disks 306 to control the torque exerted by the friction disks 306 on the hinge shaft 322; the first spring clutch 308a controls a positioning of the adjustment nut assembly 312 (and adjustment nut 313) relative to the friction disks 306 to control the force exerted by the adjustment nut assembly 313 on the friction disks 306—the smaller the distance between the adjustment nut 313 and the friction disks 306, the greater the pressure the adjustment nut 312 applies indirectly on the friction disks 306.

To that end, the positioning of the adjustment nut 313 relative to the friction disks 306 is controlled such that the appropriate torque is applied by the friction disks 306 on the hinge shaft 322. Specifically, the SMA wires 314 can facilitate control of the positioning of the adjustment nut 313 relative to the friction disks 306. The SMA wires 314 are coupled to the spring clutches 308, and in particular, the first SMA wire 314a is coupled to the first spring clutch 308a and the second SMA wire 314b is coupled to the second spring clutch 308b. The SMA wires 314, when energized can adjust in length, and in particular, when energized, can reduce in length. Specifically, the SMA wires 314, when energized (e.g., by an electric source), or are heated (e.g., by a heat source), shrinks in length—e.g., by 4%-5%. In some examples, the SMA wires 314 are referred to as "muscle" wires.

In short, when one of the SMA wires 314 is energized, the length of the SMA wire 314 is adjusted, and in particular, reduced, such that the SMA wire 314 exerts a pulling force on the respective spring clutch 308 to rotate the adjustment nut assembly 312 appropriately. By rotating the adjustment nut assembly 312, either clockwise or counter-clockwise, the positioning of the adjustment nut 313 relative to the friction disks 306 is adjusted. Thus, when one of the SMA wires 314 is energized, the length of the SMA wire 314 is adjusted to change the positioning of the adjustment nut 313 from a first position state to a second position state.

In a first example, when the first SMA wire 314a is energized, the first SMA wire 314a contracts in length, and further, exerts a pulling force on the first spring clutch 308a. This pulling force results in reducing the inner diameter of the first spring clutch 308a to approximate the outer diameter of the flange 330a. As a result, the first spring clutch 308a can "grab" the flange 330a—that is, the friction between the first spring clutch 308a and the flange 330a increases such that the first spring clutch 308a can control movement/rotation of the flange 330a, and the adjustment nut 313. The first spring clutch 308a can rotate the adjustment nut assembly 312 in a counter-clockwise direction. By rotating the adjustment nut assembly 312 in the counter-clockwise direction, the distance between the adjustment nut 313 and the friction disks 306 is increased—e.g., the adjustment nut 313 is "loosened." By increasing the distance between the adjustment nut 313 and the friction disks 306, the adjustment nut assembly 312 exerts a decreasing pressure on the friction disks 306, and thus, the friction disks 306 exert a decreasing torque on the hinge shaft 322.

In a second example, when the second SMA wire 314b is energized, the second SMA wire 314b contracts in length, and further, exerts a pulling force on the second spring clutch 308b. This pulling force results in reducing the inner diameter of the second spring clutch 308b to approximate the outer diameter of the flange 330b. As a result, the second spring clutch 308b can "grab" the flange 330b—that is, the friction between the second spring clutch 308b and the flange 330b increases such that the second spring clutch 308b can control movement/rotation of the flange 330b, and the adjustment nut 313. The second spring clutch 308b can rotate the adjustment nut assembly 312 in a clockwise direction. By rotating the adjustment nut assembly 312 in the clockwise direction, the distance between the adjustment nut 313 and the friction disks 306 is decreased—e.g., the adjustment nut 313 is "tightened." By decreasing the distance between the adjustment nut 313 and the friction disks 306, the adjustment nut assembly 312 exerts an increasing pressure on the friction disks 306, and thus, the friction disks 306 exert an increasing torque on the hinge shaft 322.

In some examples, after energizing one of the SMA wires 314, the SMA wire 314 can cool (or de-energize) such that the length of the SMA wire 314 returns to its original length. Specifically, prior to energization, the length of the SMA wires 314 are in a first state. Upon energization, the length of the energized SMA wire 314 is in a second state—e.g., a reduced length. After energization of the SMA wire 314 (after the wire 314 "cools"), the length of the SMA wire 314 returns to the first state. Furthermore, when the length of the energized SMA wire 314 returns to its original length (first state), the inner diameter of the corresponding spring clutch 308 returns to the original inner diameter and "releases" the flange 330a such that the spring clutch 308 does not control the movement/rotation of the adjustment nut assembly 312. Moreover, after cooling of the energized SMA wire 314, the adjustment nut assembly 312 remains in the adjusted position state. That is, de-energization of the SMA wire 314, and release of the spring clutch 308 from the flange 330 does not adjust the position of the adjustment nut assembly 312.

Figure 4:
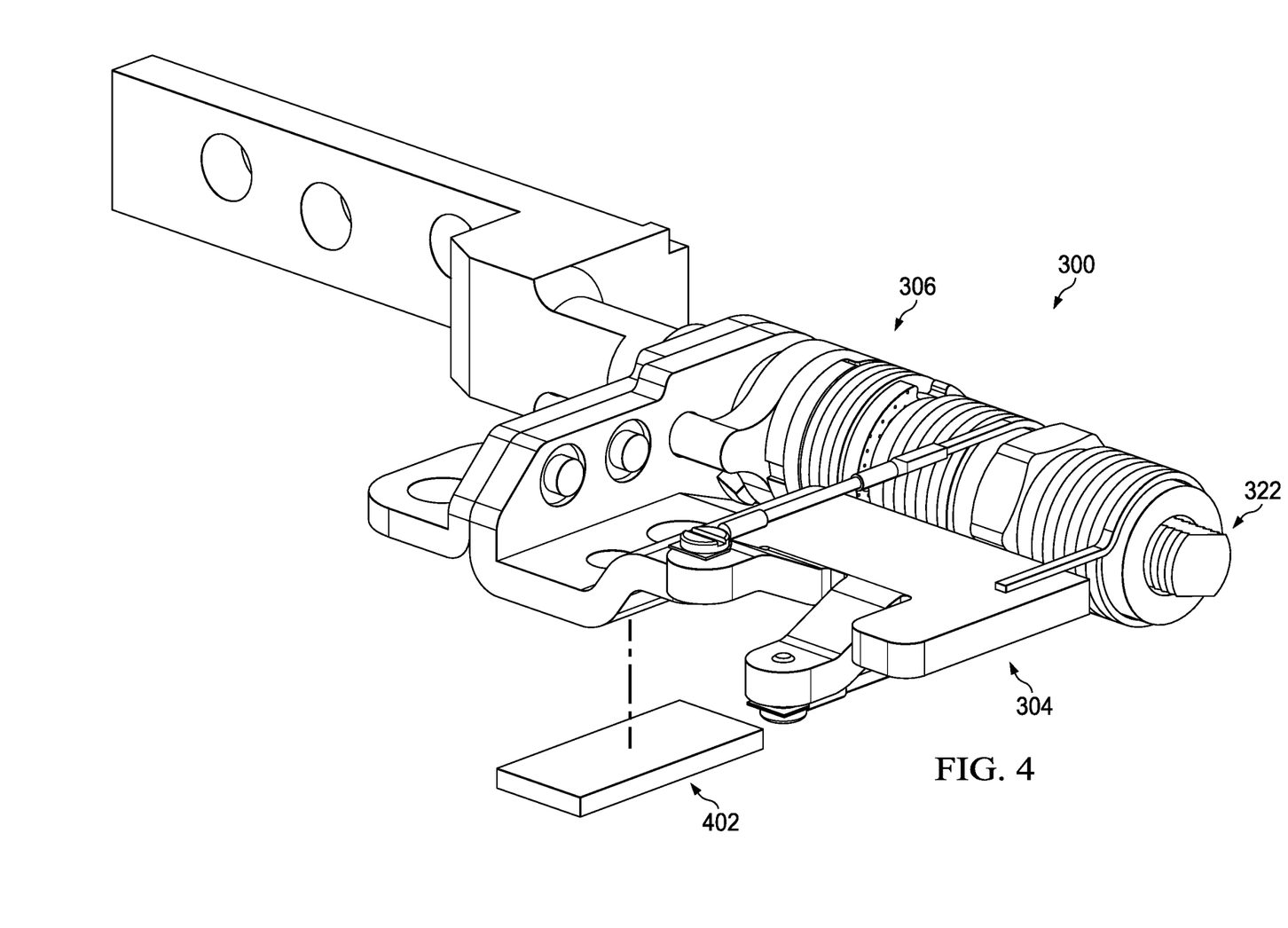
FIG. 4 illustrates the hinge assembly coupled to a sensor.

Referring to FIG. 4, in some examples, the hinge assembly 300 can include a sensor 402 that determines the torque that is exerted by the friction disks 306 on the hinge shaft 322. The sensor 402 can be mounted below the second hinge bracket 304 to track the torque level of the hinge assembly 300, and specifically, the hinge shaft 322. The sensor 402 can measure the force applied to the bodies 202, and based on such force, determine the torque that is exerted by the friction disks 306 on the hinge shaft 322. As a result of determining the torque that is exerted by the friction disks 306 on the hinge shaft 322, adjustments can be made to the positioning of the adjustment nut 313 relative to the friction disks 306 to maintain a desired torque level of the friction disks 306 (e.g., at a design level)—a closed-loop system. For example, a processor (e.g., the processor subsystem 120) can be coupled to the sensor 402 to receive the measured torque level of the friction disks 306 and determine that the measured torque level differs from a desired torque level. The processor can communicate with a controller module (not shown) of the SMA wires 314 such that the controller module has the correct amount of adjustment to be made by the SMA wires 314 to position the adjustment nut 313 in a correct relative position with respect to the friction disks 306 such that the friction disks 306 apply the desired level of torque on the hinge shaft 322. In some examples, a software user interface can be provided such that a user can indicate the desired level of torque.

Figure 5:
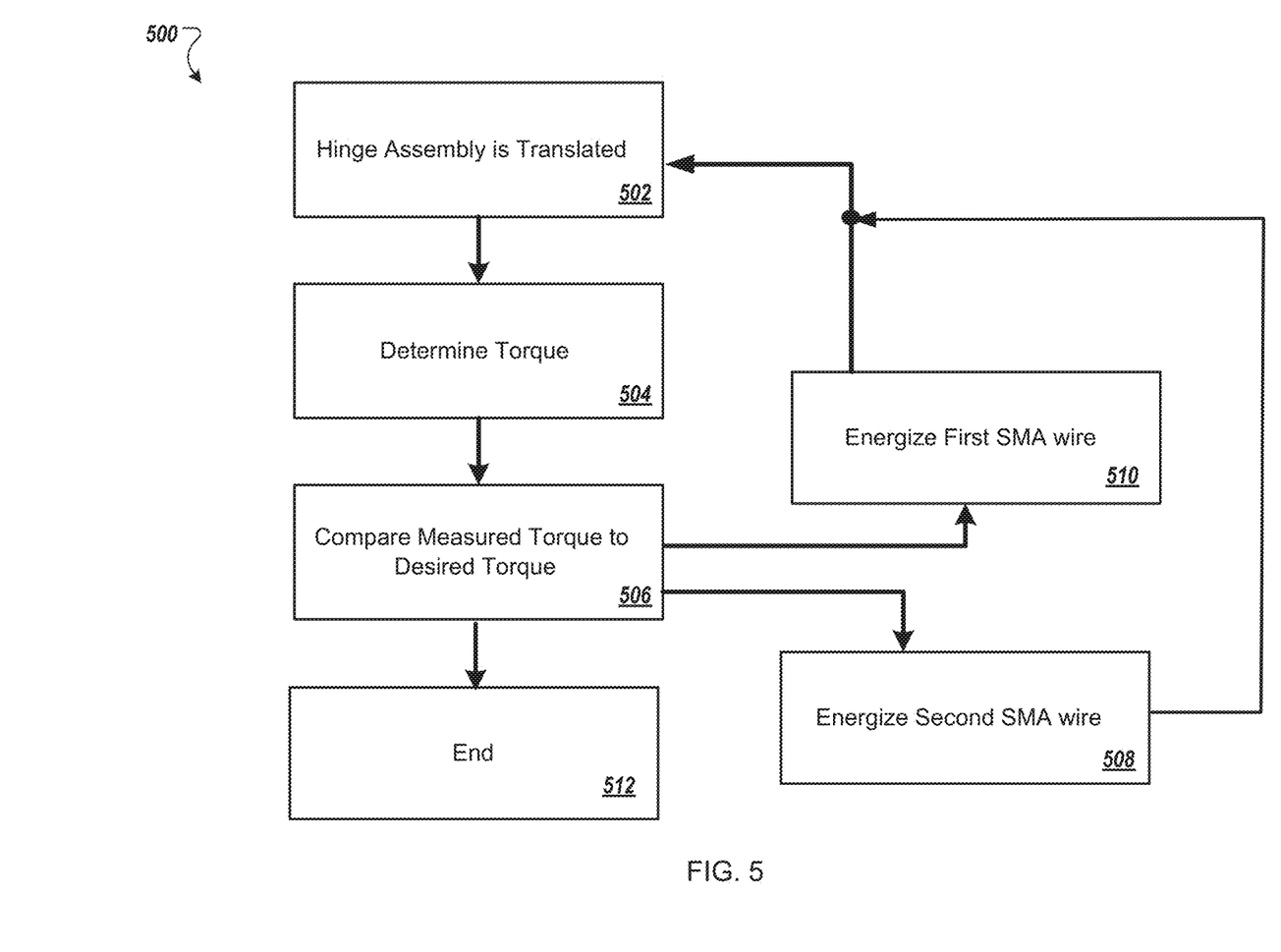
FIG. 5 illustrates a method of using the hinge assembly.

FIG. 5 illustrates a flowchart depicting selected elements of an embodiment of a method 500 for adjusting a torque level of a hinge shaft. The method 500 may be performed by the information handling system 100, and/or the hinge assembly 300 described herein with reference to FIGS. 1-4, or another information handling system. It is noted that certain operations described in method 500 may be optional or may be rearranged in different embodiments.

The hinge assembly 200 is translated (502). Specifically, one of the first hinge bracket 302 and the second hinge bracket 304 is rotated with respect to the other hinge bracket about the hinge shaft 322 (and similarly, the corresponding bodies 202 are translated/rotated as well). The sensor 402 determines the torque that is exerted by the friction disks 306 (504). That is, the sensor 402 determines the force applied to one or both of the bodies 202, and based on such force, a processor (e.g., the processor subsystem 120) is able to determine the torque that is exerted by the friction disks 306 on the hinge shaft 322. The measured torque can be compared with a desired level of torque (506). That is, the processor can compare the determined torque applied by the friction disks 306 (based on the measured force on the bodies 202) with a predetermined and/or desired level of torque (e.g., provided by user input, or otherwise provided).

In response to determining that the measured torque is less than the desired level of torque, the second SMA wire 314b can be energized (508). That is, the processor can provide a signal to energize the second SMA wire 314b such that the second spring clutch 308b rotates the adjustment nut assembly 312 in a clockwise direction. By rotating the adjustment nut assembly 312 in the clockwise direction, the distance between the adjustment nut 313 and the friction disks 306 is decreased—e.g., the adjustment nut 313 is "tightened." After adjusting the location of the adjustment nut assembly 312 relative to the friction disks 306, the process can return to step 502.

In response to determining that the measured torque is greater than the desired level of torque, the first SMA wire 314a can be energized (510). That is, the processor can provide a signal to energize the first SMA wire 314a such that the first spring clutch 308a rotates the adjustment nut assembly 312 in a counter-clockwise direction. By rotating the adjustment nut assembly 312 in the counter-clockwise direction, the distance between the adjustment nut 313 and the friction disks 306 is increased—e.g., the adjustment nut 313 is "loosened." After adjusting the location of the adjustment nut assembly 312 relative to the friction disks 306, the process can return to step 502.

In response to determining that the measured torque is substantially the same as the desired level of torque (or within a certain tolerance of the desired level of torque), the process can end (512).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A hinge assembly for a dual-body computing system, the hinge assembly comprising:
    a first hinge bracket including a hinge shaft, the first hinge bracket coupled to a first body of the dual-body computing system;
    a second hinge bracket coupled to the hinge shaft, the second hinge bracket coupled to a second body of the dual-body computing system;
    a plurality of friction disks positioned on the hinge shaft, the friction disks configured to exert a torque on the hinge shaft resulting from a clamping force along an axis of the hinge shaft;
    an adjustment nut coupled to the hinge shaft, the adjustment nut configured to exert a force on the friction disks to control the torque exerted by the friction disks on the hinge shaft;
    a first spring clutch coupled to the adjustment nut, the first spring clutch configured to control a positioning of the adjustment nut relative to the friction disks to control the force exerted by the adjustment nut on the friction disks; and
    a first shape memory alloy (SMA) wire coupled to the first spring clutch, wherein, upon energization, a length of the first SMA wire is adjusted to change the positioning of the adjustment nut from a first position state to a second position state.

2. The hinge assembly of claim 1, wherein the first spring clutch is positioned between the adjustment nut and the friction disks.

3. The hinge assembly of claim 1, further comprising:
    a second spring clutch coupled to the adjustment nut; and
    a second SMA wire coupled to the second spring clutch, wherein, upon energization, a length of the second SMA wire is adjusted to change the positioning of the adjustment nut from the second position state to a third position state.

4. The hinge assembly of claim 3, wherein upon energization, the length of the first SMA wire is adjusted to rotate the adjustment nut in a counter-clockwise direction to change the positioning of the adjustment nut from the first position state to the second position state, and, wherein upon energization, the length of the second SMA wire is adjusted to rotate the adjustment nut in a clockwise direction to change the positioning of the adjustment nut from the second position state to the third position state.

5. The hinge assembly of claim 3, wherein the first spring clutch and the second spring clutch are positioned on opposite ends of the adjustment nut.

6. The hinge assembly of claim 1, wherein, prior to energization, the length of the first SMA wire is in a first state, and upon energization, the length of the first SMA wire is in a second state, the length of the first SMA wire returning to the first state after removal of the energization of the first SMA wire.

7. The hinge assembly of claim 6, wherein upon the length of the first SMA wire returning to the first state after energization of the first SMA wire, the adjustment nut stays in the second position state.

8. The hinge assembly of claim 1, wherein the first SMA wire is electrically coupled to an electrical source to provide energization of the first SMA wire.

9. The hinge assembly of claim 1, further comprising a sensor to determine the torque exerted on the hinge shaft.

10. An information handling system, comprising:
    a dual-body computing system;
    a hinge assembly, comprising:
        a first hinge bracket including a hinge shaft, the first hinge bracket coupled to a first body of the dual-body computing system;
        a second hinge bracket coupled to the hinge shaft, the second hinge bracket coupled to a second body of the dual-body computing system;
        a plurality of friction disks positioned on the hinge shaft, the friction disks configured to exert a torque on the hinge shaft resulting from a clamping force along an axis of the hinge shaft;
        an adjustment nut coupled to the hinge shaft, the adjustment nut configured to exert a force on the friction disks to control the torque exerted by the friction disks on the hinge shaft;
        a first spring clutch coupled to the adjustment nut, the first spring clutch configured to control a positioning of the adjustment nut relative to the friction disks to control the force exerted by the adjustment nut on the friction disks; and
        a first shape memory alloy (SMA) wire coupled to the first spring clutch, wherein, upon energization, a length of the first SMA wire is adjusted to change the positioning of the adjustment nut from a first position state to a second position state.

11. The information handling system of claim 10, wherein the first spring clutch is positioned between the adjustment nut and the friction disks.

12. The information handling system of claim 10, wherein the hinge assembly further comprises:
    a second spring clutch coupled to the adjustment nut; and
    a second SMA wire coupled to the second spring clutch, wherein, upon energization, a length of the second SMA wire is adjusted to change the positioning of the adjustment nut from the second position state to a third position state.

13. The information handling system of claim 12, wherein upon energization, the length of the first SMA wire is adjusted to rotate the adjustment nut in a counter-clockwise direction to change the positioning of the adjustment nut from the first position state to the second position state, and, wherein upon energization, the length of the second SMA wire is adjusted to rotate the adjustment nut in a clockwise direction to change the positioning of the adjustment nut from the second position state to the third position state.

14. The information handling system of claim 12, wherein the first spring clutch and the second spring clutch are positioned on opposite ends of the adjustment nut.

15. The information handling system of claim 10, wherein, prior to energization, the length of the first SMA wire is in a first state, and upon energization, the length of the first SMA wire is in a second state, the length of the first SMA wire returning to the first state after removal of the energization of the first SMA wire.

16. The information handling system of claim 15, wherein upon the length of the first SMA wire returning to the first state after energization of the first SMA wire, the adjustment nut stays in the second position state.

17. The information handling system of claim 10, wherein the first SMA wire is electrically coupled to an electrical source to provide energization of the first SMA wire.

18. The information handling system of claim 10, further comprising a sensor to determine the torque exerted on the hinge shaft.

* * * * *